United States Patent
Fu (10) Patent No.: US 12,471,074 B2
(45) Date of Patent: Nov. 11, 2025

(54) METHOD AND APPARATUS FOR USING SLICING INFORMATION, AND DEVICE AND STORAGE MEDIUM

(71) Applicant: GUANGDONG OPPO MOBILE TELECOMMUNICATIONS CORP., LTD., Dongguan (CN)

(72) Inventor: Zhe Fu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 401 days.

(21) Appl. No.: 18/085,563

(22) Filed: Dec. 20, 2022

(65) Prior Publication Data

US 2023/0209521 A1    Jun. 29, 2023

Related U.S. Application Data

(63) Continuation of application No. PCT/CN2020/123360, filed on Oct. 23, 2020.

(51) Int. Cl.
*H04W 72/0453* (2023.01)
*H04W 72/563* (2023.01)
(Continued)

(52) U.S. Cl.
CPC ..... *H04W 72/0453* (2013.01); *H04W 72/563* (2023.01); *H04W 76/10* (2018.02); *H04W 76/20* (2018.02)

(58) Field of Classification Search
CPC . H04W 72/0453; H04W 76/20; H04W 76/10; H04W 72/563
See application file for complete search history.

(56) References Cited

U.S. PATENT DOCUMENTS

| 12,256,370 B2 * | 3/2025 | Mildh ............... H04W 72/0453 |
| 2020/0052803 A1 * | 2/2020 | Deenoo ................ H04W 48/12 |

(Continued)

FOREIGN PATENT DOCUMENTS

| CN | 105611637 A | 5/2016 |
| CN | 107787005 A | 3/2018 |

(Continued)

OTHER PUBLICATIONS

Extended European Search Report issued in corresponding European application No. 20958340.0, mailed Nov. 29, 2023.

(Continued)

*Primary Examiner* — Sujoy K Kundu
*Assistant Examiner* — Weibin Huang
(74) *Attorney, Agent, or Firm* — BAYES PLLC (57) ABSTRACT

Disclosed are a method and apparatus for using slicing information, and a device and a storage medium. The method includes: when first frequency point priority information and second frequency point priority information for a network slice are different, using the second frequency point priority information, or ignoring the first frequency point priority information, or updating the first frequency point priority information according to the second frequency point priority information. The first frequency point priority information is frequency point priority information saved by the terminal for the network slice, and the second frequency point priority information is frequency point priority information indicated or configured by a network side for the network slice.

15 Claims, 5 Drawing Sheets

(51) Int. Cl.
*H04W 76/10* (2018.01)
*H04W 76/20* (2018.01)

(56) References Cited

U.S. PATENT DOCUMENTS

| | | | | |
|---|---|---|---|---|
| 2021/0068013 | A1* | 3/2021 | Cheng | H04W 48/18 |
| 2021/0076321 | A1* | 3/2021 | Kim | H04W 72/56 |
| 2022/0303884 | A1* | 9/2022 | Chen | H04W 76/00 |
| 2022/0394608 | A1* | 12/2022 | Luo | H04L 45/306 |

FOREIGN PATENT DOCUMENTS

| | | | |
|---|---|---|---|
| CN | 109831807 | A | 5/2019 |
| CN | 111279741 | A | 6/2020 |
| CN | 111386727 | A | 7/2020 |
| CN | 111465060 | A | 7/2020 |
| CN | 111490899 | A | 8/2020 |
| WO | 2010017488 | A1 | 2/2010 |
| WO | 2018038576 | A1 | 3/2018 |

OTHER PUBLICATIONS

Source: CATT; Title: Cell Reselection Based on Slice Availability 3GPP TSG-RAN WG2 Meeting #101 R2-1801826 Athens, Greece, Feb. 28-Mar. 2, 2018.
Source: Spreadtrum Communications; Title: Consideration on RAN slicing 3GPP TSG-RAN WG2 Meeting #111 electronic R2-2007051 Online, Aug. 17-28, 2020.
International Search Report issued in International application No. PCT/CN2020/123360, mailed Jul. 29, 2021.
Written Opinion of the International Searching Authority issued in International application No. PCT/CN2020/123360, mailed Jul. 29, 2021.
3GPP TSG-RAN WG2 Meeting#111 R2-2006871, Electronic, Aug. 17-28, 2020, "Consideration on the scope and solutions for RAN slicing enhancement", Source: ZTE Corporation, Sanechips, Agenda item: 8.8.
3GPP TSG-RAN WG2 Meeting #111 electronic R2-2007421, Online, Aug. 17-28, 2020, "Discussion on support of RAN slicing", Agenda item: 8.8, Source: CMCC, 5 pages.
3GPP TSG-RAN WG2 Meeting #112 Electronic R2-2009067, Nov. 2-13, 2020, "Considerations for Slice-based cell (re)selection", Agenda item: 8.8.2, Source: Nokia, Nokia Shanghai Bell, 4 pages.
3GPP TS 38.331 V16.2.0 (Sep. 2020), 3rd Generation Partnership Project; Technical Specification Group Radio Access Network; NR; Radio Resource Control (RRC) protocol specification (Release 16), 916 pages.
Notice of Allowance issued in corresponding European Application No. 20958340.0, dated Oct. 1, 2024, 48 pages.
Notice of priority examination of patent application issued in corresponding Chinese Application No. 202311662007.5, dated Oct. 23, 2024, 9 pages.
First Office Opinion Notice issued in corresponding Chinese Application No. 202311662007.5, dated Oct. 24, 2024, 25 pages.

\* cited by examiner

FIG. 1

In a case where the AS of the terminal obtains slice information of the terminal, restrict use of the slice information — 201

METHOD AND APPARATUS FOR USING SLICING INFORMATION, AND DEVICE AND STORAGE MEDIUM

CROSS-REFERENCE TO RELATED APPLICATION

This application is a continuation of International Application No. PCT/CN2020/123360, filed Oct. 23, 2020, the entire contents of which are incorporated herein by reference.

TECHNICAL FIELD

Embodiments of the present disclosure relate to the wireless communication technical field, and more specifically, to a slice information usage method, an apparatus, a device and a storage medium.

BACKGROUND

The demand for wireless communication network performance is increasing day by day in various industries. Currently, for wireless communication networks, slicing based on Radio Access Network (RAN) can achieve lower latency, more targeting, greater flexibility and higher scalability of services for different services.

However, the use of a network slice requires further discussion and research.

SUMMARY

Embodiments of the present disclosure provide a slice information usage method, an apparatus, a device and a storage medium. The technical solutions are as follows.

According to an aspect of the present disclosure, there is provided a slice information usage method. The method is applied in a terminal which includes an Access Stratum (AS), and the method includes:
  in a case where the AS of the terminal obtains slice information of the terminal, restricting use of the slice information.

According to another aspect of the present disclosure, there is provided a slice information usage method. The method is applied in a terminal, and the method includes:
  when first frequency point priority information and second frequency point priority information for a network slice are different, using the second frequency point priority information, or ignoring the first frequency point priority information, or updating the first frequency point priority information according to the second frequency point priority information;
  wherein the first frequency point priority information is frequency point priority information saved by the terminal for the network slice, and the second frequency point priority information is frequency point priority information indicated or configured by a network side for the network slice.

According to another aspect of the present disclosure, there is provided a slice information usage device. The device includes an Access Stratum (AS), and the device includes:
  a restriction module configured to, in a case where the AS of the device obtains slice information of the terminal, restrict use of the slice information.

Optionally, restricting use of the slice information includes:
  the slice information being used only for at least one of: cell selection, cell reselection, resource selection and access to a network;
  and/or,
  the slice information being not allowed to be reported to a network device.

Optionally, after the terminal has completed a random access procedure, the slice information is not allowed to be reported to the network device via a first message, wherein the first message is a message for the device to reply to the network device that radio resource control establishment or reestablishment is completed.

Optionally, the restriction module is configured to, in a case where the AS of the device obtains the slice information of the device and a first condition is met, restrict the use of the slice information.

Optionally, the first condition includes at least one of the following that:
  the device supports a communication protocol version equal to or greater than a specified communication protocol version;
  the device is a device supporting at least one of cell selection, cell reselection, resource selection and access to the network based on the slice information;
  the device is a device having a capability to perform at least one of cell selection, cell reselection, resource selection and access to the network based on the slice information;
  the device is a device supporting a network slice; and
  a restriction indication sent by the network device is received.

Optionally, the slice information includes at least one of:
  a slice identity corresponding to a network slice;
  slice priority information corresponding to the network slice;
  frequency point information corresponding to the network slice; and
  frequency point priority information corresponding to the network slice.

Optionally, the slice information is determined by the device; or, the slice information is indicated or configured by the network device.

Optionally, the device further includes a Non-Access Stratrum (NAS), and the device further includes:
  a sending module configured to send, by the NAS of the device, the slice information to the AS.

Optionally, the device further includes:
  a first determination module configured to determine, by the NAS of the device, whether to send the slice information to the AS according to a mode indication from a core network device.

Optionally, the first determination module is configured to:
  in a case where the mode indication is a first mode indication, determine to send the slice information to the AS;
  in a case where the mode indication is a second mode indication, determine not to send the slice information to the AS;
  wherein the first mode indication is sent by the core network device when the device meets a second condition, and the second mode indication is sent by the core network device when the device does not meet the second condition.

Optionally, the device further includes:
a second determination module configured to determine, by the NAS of the device, whether to send the slice information to the AS according to the second condition.

Optionally, the second determination module is configured to:
determine, by the NAS of the device, not to send the slice information to the AS when it is determined that the device does not meet the second condition; or
determining, by the NAS of the device, to send the slice information to the AS when it is determined that the device meets the second condition.

Optionally, the second condition includes at least one of the following that:
the device supports a communication protocol version equal to or greater than a specified communication protocol version;
the device is a device supporting at least one of cell selection, cell reselection, resource selection and access to a network based on the slice information;
the device is a device having a capability to perform at least one of cell selection, cell reselection, resource selection, and access to the network based on the slice information; and
the device is a device supporting a network slice.

According to another aspect of the present disclosure, there is provided a slice information usage device, including:
a processing module configured to, when first frequency point priority information and second frequency point priority information for a network slice are different, use the second frequency point priority information, or ignore the first frequency point priority information, or update the first frequency point priority information according to the second frequency point priority information;
wherein the first frequency point priority information is frequency point priority information saved by the device for the network slice, and the second frequency point priority information is frequency point priority information indicated or configured by a network side for the network slice.

Optionally, the processing module is configured to:
in a first case, when the first frequency point priority information and the second frequency point priority information for the network slice are different, use the second frequency point priority information, or ignore the first frequency point priority information, or update the first frequency point priority information according to the second frequency point priority information, wherein the first case includes at least one of the following that:
a T320 timer does not expire;
a first timer does not expire, and the first frequency point priority information is valid before expiry of the first timer;
the device does not initiate a Radio Resource Control (RRC) connection establishment procedure; and
the device is in a non-connected state.

Optionally, the device further includes an obtaining module configured to:
obtain, by an Access Stratum (AS) of the device, the first frequency point priority information via system information;
or,
obtain, by the AS of the device, the first frequency point priority information via a dedicated RRC message;
or,
obtain, by the AS of the device, the first frequency point priority information from a Non-Access Stratum (NAS), wherein the first frequency point priority information is obtained by the NAS from a core network device.

Optionally, the device further includes:
a receiving module configured for the device to receive slice information indicated or configured by a network device, wherein the slice information includes the second frequency point priority information.

Optionally, the slice information further includes at least one of:
a slice identity corresponding to the network slice;
slice priority information corresponding to the network slice;
frequency point information corresponding to the network slice; and
frequency point priority information corresponding to the network slice.

Optionally, the receiving module is configured for the device to receive a dedicated RRC message sent by an access network device, wherein the dedicated RRC message carries the slice information;
or,
the receiving module is configured for the device to receive a broadcast message sent by the access network device, wherein the broadcast message carries the slice information;
or,
the receiving module is configured for the device to receive a NAS message sent by a core network device, wherein the NAS message carries the slice information.

According to another aspect of the present disclosure, there is provided a terminal, including: a processor; a transceiver connected to the processor; and a memory for storing instructions executable by the processor; wherein the processor is configured to load and execute the executable instructions to implement the slice information usage method according to the above aspect(s).

According to another aspect of the present disclosure, there is provided a computer readable storage medium having executable instructions stored thereon, wherein the executable instructions are loaded and executed by a processor to implement the slice information usage method according to the above aspect(s).

According to another aspect of the present disclosure, there is provided a computer program product. Executable instructions are stored in the readable storage medium. The executable instructions are loaded and executed by a processor to implement the slice information usage method according to the above aspect(s).

According to another aspect of the present disclosure, there is provided a chip. The chip is configured to perform the slice information usage method according to the above aspect(s).

The technical solutions provided by the present disclosure includes at least the following beneficial effects.

The use of the slice information is restricted when the slice information of the terminal is obtained through the AS of the terminal. The slice information is only used for at least one of cell selection, cell reselection, resource selection and access to the network. In this way, it can be ensured that the terminal quickly accesses a corresponding network slice in accordance with the slice information. The slice information is not allowed to be reported to the network device, which can avoid the possible security risk of leakage of the slice information in an unencrypted message sent by the terminal to the network device.

BRIEF DESCRIPTION OF THE DRAWINGS

In order to more clearly illustrate the technical solutions in embodiments of the present disclosure, the following is a brief description of the drawings to be used in the description of the embodiments. It is obvious that the drawings in the following description are only some of the embodiments of the present disclosure, and other drawings can be obtained based on these drawings without any creative work for a person of ordinary skill in the art.

DETAILED DESCRIPTION

In order to make the purpose(s), technical solutions and advantages of the present disclosure clearer, the following is a further detailed description of implementations of the present disclosure with reference to accompanying drawings.

The demand for wireless communication network performance is increasing day by day in various industries. To improve the performance of wireless communication networks in terms of latency, mobility, reliability, and location accuracy, network slices of RANs are often used. For a network slice, it has an independent topology, a virtual network resource, traffic and configuration rule(s). That is, a network slice is a set of network functions with specific wireless configurations and transmission configurations that enable the provisioning of multiple different end-to-end virtual networks on the same set of network device(s). Examples include a network slice for the Internet of Things (IOT), a network slice for the Internet of Vehicles, and a network slice for specific users, and so on. In the procedure of building network slices for a RAN, a service provider using a network slice can participate in the design, deployment and operation of the RAN to better support the service provider's service according to the service provider's needs.

Currently, in Release 17 (5G communication protocol version, also known as R17), enhancement on RAN support of network slicing includes cell reselection by User Equipment (UE) based on a network slice, and determination of configuration or access restriction of a Random Access Channel (RACH) of a UE based on a network slice.

Current Use of Network Slice(s)

Currently, when an Access Stratum (AS) of a UE receives slice information for a network slice from a Non-Access Stratum (NAS) of the UE, e.g. Single Network Slice Selection Assistance Information (S-NSSAI) or Network Slice Selection Assistance Information (NSSAI), the UE sends the S-NSSAI or NSSAI to a 5G base station (5G Node B, gNB). The gNB can select a corresponding Access and Mobility Management Function (AMF) entity to provide a service corresponding to the network slice. The S-NSSAI or NSSAI is used to identify the network slice corresponding to the UE. The S-NSSAI is used to identify a single network slice, and the NSSAI can include multiple S-NSSAIs. In the procedure of sending the S-NSSAI or NSSAI to the gNB (e.g., sending is performed based on the MSG5 message, and MSG5 is used by the UE to reply to the gNB that the radio resource control establishment or establishment has completed), the sent message is unencrypted. It may lead to leakage of slice information and there is a security risk.

Cell Reselection

Cell reselection refers to a procedure in which a UE in an idle mode monitors signal qualities of a currently accessed cell and neighboring cell(s) of the currently accessed cell, and selects and accesses a cell with the best signal. When the signal quality and level of a neighboring cell meet the S (Srxlev) criterion and a certain reselection criterion is met, the UE will access the neighboring cell and camp on the cell. The reselection criterion means that the UE performs cell reselection using a cell reselection strategy which is based on a frequency priority in order to meet the load balancing in an idle mode during the cell selection and reselection procedure.

After the UE camps on a cell, the UE continuously performs measurement on the cell. The UE calculates a S-value based on the Radio Resource Control (RRC) layer according to a Reference Signal Received Power (RSRP) measurement result, and compares the S-value with an intra-frequency measurement start threshold (Sintrasearch) and an inter-frequency/inter-system measurement start threshold (Snonintrasearch) to determine whether to start the measurement of a neighboring cell.

For intra-frequency cells or equal priority inter-frequency cells, the UE uses a R criterion for cell reselection. Specifically, the UE rank cells according to their signal qualities and a cell with the best signal quality is selected as the candidate target cell for reselection. For a cell with a high frequency priority, as long as the cell signal quality meets a certain threshold, the cell with the high frequency priority is reselected by the UE. For a cell with a low frequency priority, the cell with the low frequency priority is reselected only when the signal quality of the cell where the UE resides is below a certain threshold.

The UE is able to obtain frequency point priority information for indicating the frequency point priority via system information, and dedicated information (e.g., RRCrelease message) transmitted between the UE and a network device. The UE is able to perform cell selection or reselection based on the frequency point priority information. The frequency point priority information in the RRCrelease message is valid during the duration of a first timer (e.g., T320) of the UE, and/or, is invalid after the UE enters a connected state.

However, in a network with network slices, the frequency point priority corresponding to one network slice may be different in different cells. Thus, it can happen that the frequency point priority is obtained by a UE in a previous cell, and when the UE moves to another cell, the obtained frequency point priority may be different from the priority of the same frequency point in the new cell it moves to, i.e., the frequency point priority information changes. However, a timer in the UE may have not expired at this time, which may result in that the UE cannot select to a cell which matches the frequency point priority of the network slice where the UE is. This causes problems in the services provided by the network slice used by the UE. For example, in terms of latency performance, the UE accesses a new cell, but in the new cell, the frequency point priority of the network slice used by the UE is relatively low. When the UE needs to use the services carried by the network slice, the network device needs to transfer the UE to another cell, resulting in transmission delay for the services used by the UE through the network slice.

Figure 1:
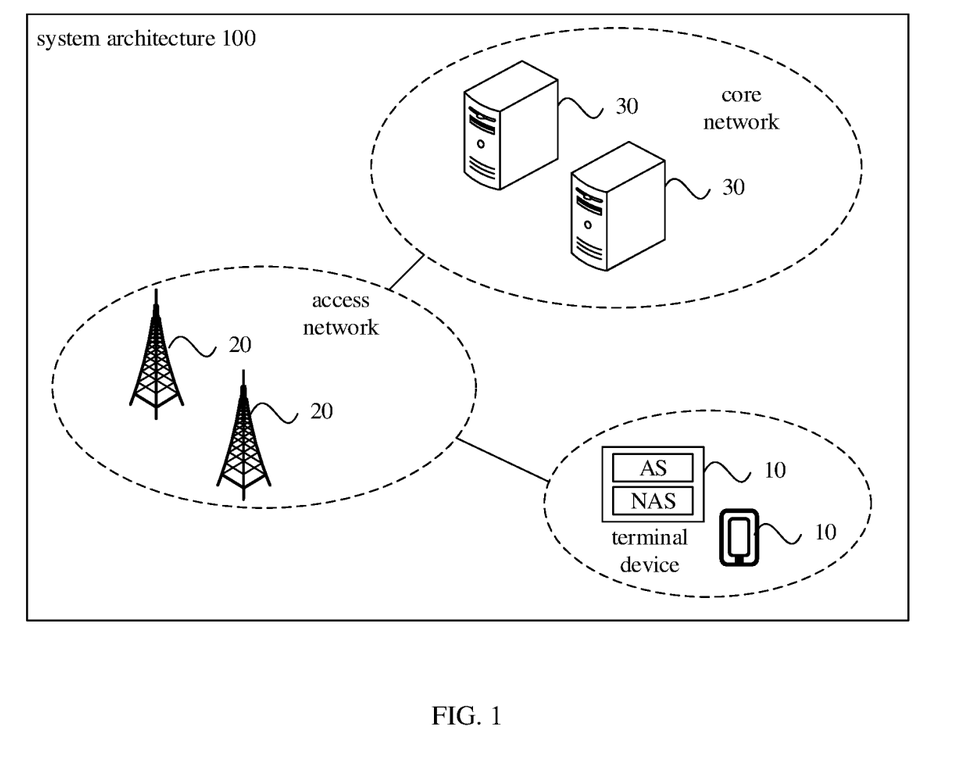
FIG. 1 is a diagram of a network architecture of a communication system according to an example embodiment of the present disclosure.

FIG. 1 illustrates a schematic diagram of a system architecture according to one embodiment of the present disclosure. The system architecture may include: a terminal device 10, an access network device 20, and a core network device 30.

The terminal device 10 may refer to a UE, an access terminal, a user unit, a user station, a mobile station, a mobile apparatus, a remote station, a remote terminal, a mobile device, a wireless communication device, a user agent, or a user device. Optionally, the terminal device may also be a cellular telephone, a cordless telephone, a Session Initiation Protocol (SIP) telephone, a Wireless Local Loop (WLL) station, a Personal Digital Assistant (PDA), a handheld device with wireless communication capabilities, a computing device or other processing device connected to a wireless modem, an in-vehicle device, a wearable device, a terminal device in 5GS or a terminal device in a future evolved Public Land Mobile Network (PLMN), etc., which are not limited by the embodiments of the present disclosure. For the convenience of description, the above mentioned devices are collectively referred to as terminal. The number of terminal devices 10 is typically more than one, and one or more terminal devices 10 may be distributed within a cell managed by each access network device 20.

The access network device 20 is a device deployed in an access network for providing wireless communication functions to terminal devices 10. The access network device 20 may include various forms of macro base station, micro base station, relay station, access point, etc. The name of the device having the access network device function may vary in systems using different wireless access technologies, such as gNodeB or gNB in 5G NR systems. The name "access network device" may change as communication technologies evolve. For ease of description, in embodiments of the present disclosure, the above devices that provide wireless communication functions to the terminal device 10 are collectively referred to as access network device. Optionally, through the access network device 20, a communication relationship may be established between the terminal device 10 and the core network device 30. Exemplarily, in a Long Term Evolution (LTE) system, the access network device 20 may be Evolved Universal Terrestrial Radio Access Network (EUTRAN) or one or more eNodeB in EUTRAN; in the 5G NR (5G New Radio) system, the access network device 20 may be Radio Access Network (RAN) or one or more gNBs in the RAN.

The function of the core network device 30 is mainly to provide user connectivity, management of users and completion of bearer for services, and as a bearer network, provide the interface to an external network. For example, the core network device in a 5G NR system may include devices such as an AMF entity, a User Plane Function (UPF) entity, and a Session Management Function (SMF) entity.

In one example, the access network device 20 and the core network device 30 communicate with each other via some over-the-air technology, such as the NG interface in a 5G NR system. The access network device 20 and the terminal device 10 communicate with each other via some over-the-air technology, such as a Uu interface.

It should be noted that the terminal device 10 includes an AS and a NAS. The AS is used for information transmission between the terminal device 10 and the access network device 20 to which the terminal device 10 accesses. The NAS is used for information transmission between the terminal device 10 and the core network device 30 to which the terminal device 10 accesses. During the information transmission between the terminal device 10 and the core network device 30, the access network device 20 between the terminal device 10 and the core network device 30 accessed by the terminal device 10 transmits the information transparently.

Figure 2:
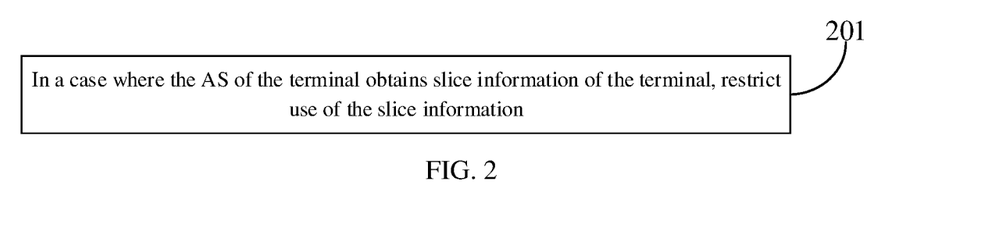
FIG. 2 is a flowchart of a slice information usage method according to an example embodiment of the present disclosure.

FIG. 2 illustrates a flowchart of a slice information usage method according to an embodiment of the present disclosure. FIG. 2 illustrates, by way of example, the method as applied to a terminal device in the communication system shown in FIG. 1. The method includes the following contents.

In step 201, in a case where the AS of the terminal obtains slice information of the terminal, use of the slice information is restricted.

The AS of the terminal is used to realize functions related to a wireless communication interface corresponding to the terminal, including for example, radio bearer management (including radio bearer allocation, establishment, modification and release), radio channel processing (including channel coding and modulation), encryption (encryption for the AS itself) and mobility management (such as cell selection, cell handover and cell reselection, etc.).

The slice information of the terminal means information of at least one of: the supported, requested, configured, allowed, interested, and intended network slice of the terminal. Alternatively, the slice information of the terminal refers to information about a network slice supported by the network which the terminal camps on. Exemplarily, the slice information includes at least one of: a slice identity corresponding to the network slice; slice priority information corresponding to the network slice; frequency point information corresponding to the network slice; and frequency point priority information corresponding to the network slice.

The slice information is determined by the terminal, or, the slice information is indicated by the network device for the terminal. For example, the AS of the terminal receives the slice information sent by the NAS of the terminal. Alternatively, the AS of the terminal receives the slice information sent by the NAS of the terminal as indicated by the core network device.

The terminal restricts the use of the slice information, including but not limited to: the terminal uses the slice information in such a way that the slice information is only used for at least one of cell selection, cell reselection, resource selection, and access to the network, and/or, the slice information is not allowed to be reported to the network device.

In summary, in the method provided in this embodiment, the AS of the terminal restricts the use of the slice information when the slice information of the terminal is obtained. The slice information is only used for at least one of cell selection, cell reselection, resource selection and access to the network, which can ensure that the terminal quickly accesses a corresponding network slice in accordance with the slice information. The slice information is not allowed to be reported to the network device, which can avoid the possible security risk of leakage of the slice information in the unencrypted message(s) sent by the terminal to the network device.

Figure 3:
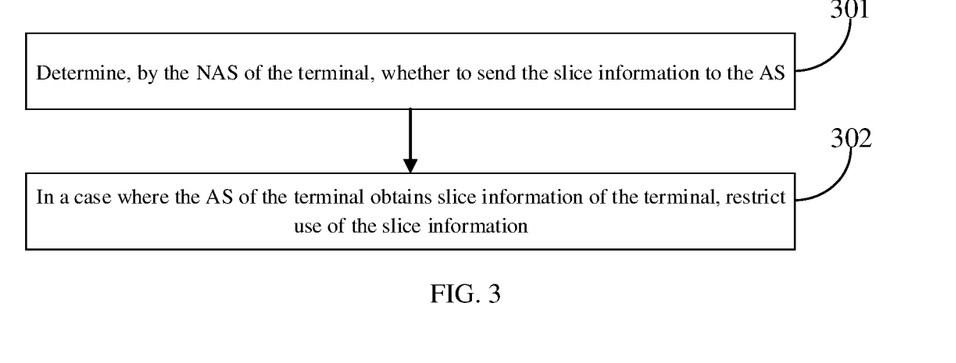
FIG. 3 is a flowchart of a slice information usage method according to an example embodiment of the present disclosure.

FIG. 3 illustrates a flowchart of a slice information usage method according to an example embodiment of the present disclosure. FIG. 3 illustrates, by way of example, the method as applied to a terminal device in the communication system shown in FIG. 1. The method includes the following contents.

In step 301, the NAS of the terminal determines whether to send slice information to the AS.

The NAS of the terminal is used to implement functions unrelated to access of terminal to the network, including for example, session management (including session establishment, modification, and release), user management (including user data management, attachment, and de-attachment), security management (including authentication and encryption initialization between end users and the network), and operator charging.

In one implementation, the NAS of the terminal determines whether to send slice information to the AS according to a mode indication from the core network device. Optionally, in a case where the mode indication is a first mode indication, the NAS of the terminal determines to send the slice information to the AS. In a case where the mode indication is a second mode indication, the NAS of the terminal determines not to send the slice information to the AS. The first mode indication is sent by the core network device when the terminal meets a second condition. The second mode indication is sent by the core network device when the terminal does not meet the second condition.

In another implementation, the NAS of the terminal determines whether to send the slice information to the AS according to the second condition.

The NAS of the terminal determines not to send the slice information to the AS when it is determined that the terminal does not meet the second condition.

The NAS of the terminal determines to send the slice information to the AS when it is determined that the terminal meets the second condition.

Optionally, the second condition in the above implementation(s) includes at least one of the following.
the terminal supports a communication protocol version equal to or greater than a specified communication protocol version;
the terminal is a terminal supporting at least one of cell selection, cell reselection, resource selection and access to the network based on the slice information;
the terminal is a terminal having a capability to perform at least one of cell selection, cell reselection, resource selection, and access to the network based on the slice information;
the terminal is a terminal that supports a network slice.

Exemplarily, the specified communication protocol version refers to Release 17. The terminal supporting a network slice means that the terminal is capable of accessing a network slice or a specific network slice and using the service(s) carried by the network slice. The "specific" may also be understood as "specified".

In step 302, the use of the slice information is restricted in a case where the AS of the terminal obtains the slice information of the terminal.

Restricting the use of the slice information means that the terminal uses the slice information in such a way that the slice information is only used for at least one of cell selection, cell reselection, resource selection, and access to the network, and/or that the slice information is not allowed to be reported to the network device. The slice information being not allowed to be reported to the network device specifically means that the slice information is not allowed to be reported to the network device via a first message after the terminal has completed a random access procedure. The first message is a message for the terminal to reply to the network device that the radio resource control establishment or reestablishment has completed, for example, the first message is an MSG5 message.

Optionally, the slice information includes at least one of the following.
a slice identity corresponding to the network slice, such as NSSAI, S-NSSAI;
slice priority information corresponding to the network slice;
frequency point information corresponding to the network slice;
frequency point priority information corresponding to the network slice.

The slice information is determined by the terminal, or, the slice information is indicated or configured by a network device to which the terminal accesses. The network device accessed by the terminal may be a network device that the terminal currently accesses or camps on, or it may be a network device that the terminal previously accessed or camped on. Optionally, the NAS of the terminal can send the slice information to the As. In the case that the AS of the terminal obtains the slice information of the terminal and a first condition is met, the terminal restricts the use of the slice information. Optionally, the first condition includes at least one of the following: the terminal supports a communication protocol version equal to or greater than a specified communication protocol version; the terminal is a terminal supporting a network slice; the terminal is a terminal supporting at least one of cell selection, cell reselection, resource selection, and access to the network based on the slice information; the terminal is a terminal having the capability to perform at least one of cell selection, cell reselection, resource selection, and access to the network based on the slice; and the terminal receives a restriction indication from the network device.

Figure 4:
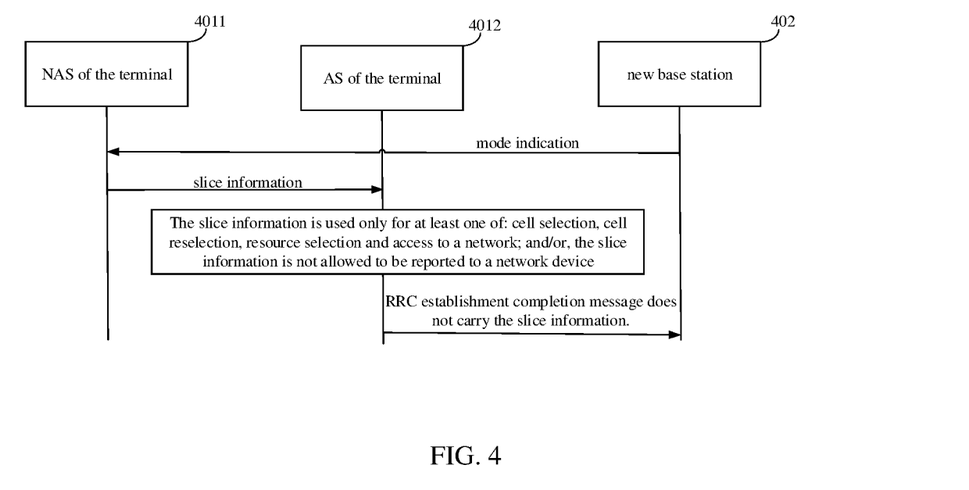
FIG. 4 is a schematic diagram of an implementation procedure of obtaining slice information by AS of a terminal according to an example embodiment of the present disclosure.

In a specific example, FIG. 4 is schematic diagram of an implementation procedure of obtaining slice information by AS of a terminal according to an example embodiment of the present disclosure. As shown in FIG. 4, the NAS 4011 of the terminal sends the slice information to the AS 4012 of the terminal. The source of the slice information is at least one of terminal determination and network device indication.

For example, the slice information is frequency point information corresponding to the network slice, and in this situation the slice information is indicated or configured by the network device. The slice information is frequency point priority information corresponding to the network slice, and in this situation the slice information is indicated or configured by the network device. The slice information is the slice identity, and in this situation the slice information is requested by the terminal, or allowed for the terminal, or configured for the terminal, or intended by the terminal, or interested by the terminal. The slice information is the slice identity, which may also be a slice identity supported by the network. The slice priority information for the network slice may be configured or indicated by the network or determined by the terminal.

When the terminal meets the first condition, the AS 4012 of the terminal restricts the use of the slice information. The first condition includes at least one of the following: a communication protocol version of the terminal is equal to or greater than the specified communication protocol version (e.g., R17); the terminal is a terminal that supports at least one of cell selection, cell reselection, resource selection, and access to the network based on the slice information; the terminal is a terminal having the capability to perform at least one of cell selection, cell reselection, resource selection, and access to the network based on the slice; the terminal is a terminal that supports the network slice; and the terminal receives a restriction indication sent by the network device (e.g., the terminal obtains the restriction indication via the NAS or a broadcast from the network device). Restricting the use of the slice information means that, in a case where the AS 4012 of the terminal obtains the slice information and uses the slice information, the slice information is used only for at least one of cell selection, cell reselection, resource selection and access to the network by the terminal, and/or the terminal does not report the slice information to the network. The resource selection includes: when the terminal performs service transmission, it selects an appropriate random access resource to access the network based on the slice information. For example, the terminal selects an RACH resource corresponding to the network slice based on the slice information to access a channel and establish an RRC connection with the network. The terminal does not report the slice information to the network, meaning that the terminal does not carry the slice information when performing message transmission with the network device over the air interface. For example, the terminal reports an RRC message or MSG5 message or connection establishment completion message to the network device.

Before NAS 4011 of the terminal sends the slice information to AS 4012 of the terminal, a logic for determining whether to send the slice information is executed. The NAS 4011 of the terminal determines whether to send the slice information to the AS 4012 of the terminal based on the mode indication from the core network device (transmitted transparently through the new base station 402, and the new base station 402 refers to the base station where the terminal currently camps on). When the core network device determines that the terminal meets the second condition, it indicates the NAS 4011 of the terminal to send the slice information to the AS 4012 of the terminal. For example, the core network device indicates NAS 4011 of the terminal to send the slice information to AS 4012 of the terminal via a NAS message (e.g., a registration message). Alternatively, the NAS 4011 of the terminal determines whether to send the slice information to the AS 4012 of the terminal based on a second condition. The second condition is at least one of the following: the terminal supports a communication protocol version equal to or greater than the specified communication protocol version (e.g., R17); and the terminal supports a network slice.

In summary, in the method provided by the embodiments, the AS of the terminal restricts the use of the slice information when the slice information of the terminal is obtained. The slice information is only used for at least one of cell selection, cell reselection, resource selection and access to the network, which can ensure that the terminal quickly accesses a corresponding network slice in accordance with the slice information. The slice information is not allowed to be reported to the network device, which can avoid the possible security risk of leakage of the slice information in the unencrypted message(s) sent by the terminal to the network device.

In addition, the network slice accessed by the terminal can achieve enhanced performance of the network services required by the terminal. A network slice dedicated to enhancing the performance of a network service is provided.

Figure 5:
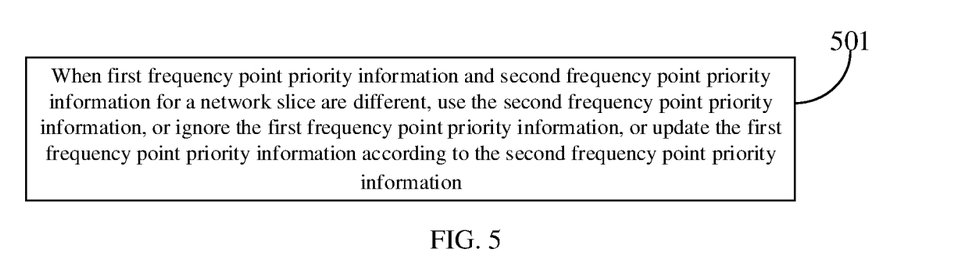
FIG. 5 is a flowchart of a slice information usage method according to an example embodiment of the present disclosure.

FIG. 5 illustrates a flowchart of a slice information usage method according to an example embodiment of the present disclosure. FIG. 5 illustrates, by way of example, the method as applied to a terminal device in the communication system shown in FIG. 1. The method includes the following contents.

In step 501, when first frequency point priority information and second frequency point priority information for a network slice are different, the second frequency point priority information is used, or the first frequency point priority information is ignored, or the first frequency point priority information is updated according to the second frequency point priority information.

The first frequency point priority information is: frequency point priority information saved by the terminal for the network slice, i.e., the frequency point priority information corresponding to the network slice saved by the terminal itself; or, the frequency point priority information corresponding to the network slice written in the NAS; or the frequency point priority information corresponding to the network slice previously obtained through a network device which the terminal accesses or camps on. Specifically, the terminal may obtain the frequency point priority information corresponding to the network slice when accessing the network (e.g., through dedicated information such as an RRC message, or a NAS message); or, the terminal may obtain the frequency point priority information corresponding to the network slice through system information. The second frequency point priority information is the frequency point priority information indicated or configured by the network side for the network slice, i.e., the frequency point priority information indicated by the network side for the network slice, or the frequency point priority information for the network slice indicated by a network device which the terminal accesses or camps on, or the frequency point priority information for the corresponding network slice supported or configured by the network device as indicated by the network device which the terminal accesses or camps on. The first frequency point priority information and the second frequency point priority information correspond to the same network slice.

Optionally, the AS of the terminal obtains the first frequency point priority information through system information, a dedicated RRC message, or the NAS. The AS of the terminal obtains the first frequency point priority information through the NAS, the first frequency point priority information is obtained from the core network device by the NAS, or the first frequency point priority information is written to or stored in the NAS. The terminal obtains the second frequency point priority information according to the slice information indicated or configured by the network device, and the slice information includes the second frequency point priority information. For example, the terminal receives a dedicated RRC message sent by the access network device, and the dedicated RRC message carries the slice information. Alternatively, the terminal receives a broadcast message sent by the access network device, and the broadcast message carries the slice information. Alternatively, the terminal receives a NAS message sent by the core network device, and the NAS message carries the slice information. Optionally, the system information includes at least one of SIB2 (System Information Block 2), SIB3, SIB4, and SIB5.

When the terminal performs cell selection or reselection, the frequency point priority set for the same network slice changes between an original access network device which the terminal access/camps on and a new access network device which the terminal currently accesses/camps on, i.e., the first frequency point priority information and the second frequency point priority information may be different. In this case, the terminal uses the second frequency point priority information, ignores the first frequency point priority information, or, updates the first frequency point priority information according to the second frequency point priority information. Further, in a first case, when the first frequency point priority information and the second frequency point priority information for the network slice are different, the second frequency point priority information is used, or the first frequency point priority information is ignored, or the first frequency point priority information is updated according to the second frequency point priority information. The performance of the network which the terminal accesses can be optimized based on the second frequency point priority information. The first case includes at least one of the following: the T320 timer of the terminal does not expire; the first timer of the terminal does not expire, and the first frequency point priority information is valid before the first timer expires; the terminal does not initiate the RRC connection establishment procedure; and the terminal is in a non-connected state.

In summary, in the method provided in embodiments of the present disclosure, the frequency point priority information for the network slice is adjusted according to the second frequency point priority information when the first frequency point priority information and the second frequency point priority information for the network slice are different. The method can solve the problem of inaccurate frequency point priority confirmation caused by different frequency point priority information for the same network slice supported by different cells when performing cell handover, thereby avoiding determining the frequency point priority based on timer information only.

Figure 6:
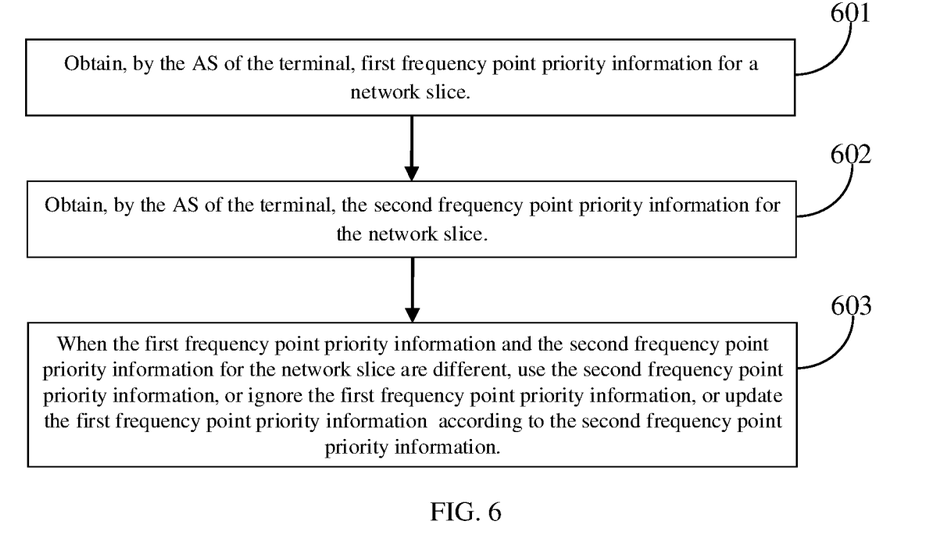
FIG. 6 is a flowchart of a slice information usage method according to an example embodiment of the present disclosure.

FIG. 6 illustrates a flowchart of a slice information usage method according to an example embodiment of the present disclosure. FIG. 6 illustrates, by way of example, the method as applied to a terminal device in the communication system shown in FIG. 1. The method includes the following contents.

In step 601, the AS of the terminal obtains first frequency point priority information for a network slice.

The first frequency point priority information is: the frequency point priority information saved by the terminal for the network slice, i.e., the frequency point priority information corresponding to the network slice saved by the terminal itself; or, the frequency point priority information corresponding to the network slice written in the NAS; or the frequency point priority information corresponding to the network slice previously obtained through a network device which the terminal accesses or camps on.

Optionally, the AS of the terminal obtains the first frequency point priority information via system information. Alternatively, the AS of the terminal obtains the first frequency point priority information via a dedicated RRC message. Alternatively, the AS of the terminal obtains the first frequency point priority information from the NAS, and the first frequency point priority information is obtained by the NAS from the core network device.

In step 602, the AS of the terminal obtains the second frequency point priority information for the network slice.

This second frequency point priority information is the frequency point priority information indicated or configured for the network slice by the network side, that is, the frequency point priority information for the network slice of the network device as indicated or configured by the network device which the terminal accesses or camps on. The network slice of the network device may be a network slice supported or configured by the network device. The first frequency point priority information and the second frequency point priority information correspond to the same network slice.

The terminal receives the slice information indicated or configured by the network device, the slice information including the second frequency point priority information. Optionally, the terminal receives a dedicated RRC message from the access network device, and the dedicated RRC message carries the slice information. Alternatively, the terminal receives a broadcast message sent by the access network device, and the broadcast message carries the slice information. Alternatively, the terminal receives a NAS message sent by the core network device, and the NAS message carries the slice information.

In step 603, when the first frequency point priority information and the second frequency point priority information for the network slice are different, the second frequency point priority information is used, or the first frequency point priority information is ignored, or, the first frequency point priority information is updated according to the second frequency point priority information.

Optionally, in a first case, when the first frequency point priority information and the second frequency point priority information for the network slice are different, the second frequency point priority information is used, or the first frequency point priority information is ignored, or the first frequency point priority information is updated according to the second frequency point priority information. The first case includes at least one of the following:

The T320 timer does not expire;

Optionally, the duration of the T30 timer may be a finite value or may be an infinite value.

The first timer does not expire; the first frequency point priority information is valid before expiry of the first timer;

The first timer may be the T320 timer, or a timer similar in function to the T320 timer.

Optionally, the first timer may be run for a specific network slice or a network slice group, or the first timer may be run for all network slices. The "specific" may also be understood to be "specified".

Optionally, the value of the duration of the first timer for a specific network slice or a network slice group may be the same or different.

Optionally, the duration of the first timer may be a finite value or may be an infinite value.

The terminal does not initiate an RRC connection establishment procedure;

The terminal is in a non-connected state.

The terminal starts the T320 timer when it receives information for performing cell reselection, such as an RRCrelease message. When this T320 timer is running (does not expire), the information for performing cell reselection is considered valid in the related art. When this T320 timer expires, the information for performing cell reselection is invalid. But here, since the information for the network slice, such as the first frequency priority information (i.e., the saved slice information) and the second frequency point priority information may be different, the information for the network slice used for cell reselection may not be valid at this time even if the timer does not expire and/or the terminal is still in the non-connected state. Therefore, it is necessary to use the second frequency point priority information, or ignore the first frequency point priority information, or update the first frequency point priority information according to the second frequency point priority information when the two frequency point priority information is different, even if the timer does not expire and/or the terminal is still in the non-connected state.

Further, when the first slice information saved by the terminal for the network slice (the first slice information for the network slice saved by the terminal itself) and the second slice information indicated or configured by the network side for the network slice (the second slice information for the network slice of the network device as indicated or configured by the network device which the terminal accesses or camps on) are different, the terminal uses the second slice information, or ignores the first slice information, or updates the first slice information according to the second slice information. The first slice information and the second slice information correspond to the same network slice.

Optionally, the first slice information includes at least one of the following:

a slice identity corresponding to the network slice;

slice priority information corresponding to the network slice;

frequency point information corresponding to the network slice;

frequency point priority information corresponding to the network slice.

Optionally, the second slice information includes at least one of the following:

a slice identity corresponding to the network slice;

slice priority information corresponding to the network slice;

frequency point information corresponding to the network slice;

frequency point priority information corresponding to the network slice.

Optionally, the terminal restricts the use of the acquired slice information, including but not limited to: the terminal uses the slice information in such a way that the slice information is only used for at least one of cell selection, cell reselection, resource selection, and access to the network, and/or, the slice information is not allowed to be reported to the network device.

Figure 7:
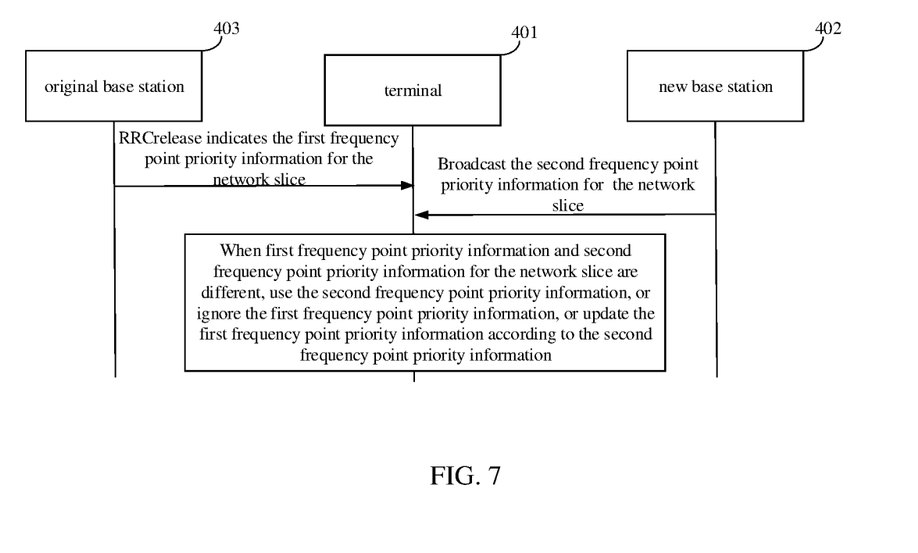
FIG. 7 is a schematic diagram of an implementation procedure of obtaining first frequency point priority information as well as second frequency point priority information by a terminal according to an example embodiment of the present disclosure.

Exemplarily, FIG. 7 is a schematic diagram of an implementation procedure of obtaining first frequency point priority information as well as second frequency point priority information by a terminal according to an example embodiment of the present disclosure. As shown in FIG. 7, a terminal 401 obtains the first frequency point priority information and the second frequency point priority information through a network device. The AS of terminal 401 obtains the first frequency point priority information via a dedicated RRC message (i.e., RRCrelease message) sent by an original base station 403. The terminal 401 receives a broadcast message sent by a new base station 402, and the broadcast message carries slice information, and the slice information includes the second frequency point priority information. The original base station 403 is a base station which the terminal 401 accesses before it accesses to the new base station 402. That is, when the terminal 401 accesses a new base station, the terminal obtains the frequency point priority information for the network slice (the network slice where the terminal is) under the current base station. When the slice information obtained by the terminal 401 includes the frequency point priority information corresponding to the network slice, the terminal 401 also obtains the frequency point priority information when it obtains the slice information. Optionally, the terminal 401 is also able to obtain the first frequency point priority according to the system information. Optionally, the system information includes at least one of SIB2 (System Information Block 2), SIB3, SIB4, and SIB5.

When the first frequency point priority information for the network slice saved by the terminal 401 (obtained from the original base station 403) is different from the second frequency point priority information for the network slice obtained from the new base station 402, in a first case, the terminal 401 uses the second frequency point priority information, ignores the first frequency point priority information, or updates the first frequency point priority information according to the second frequency point priority information. This enables the terminal 401 to optimize the frequency point priority information for the network slice for the terminal 401 based on the currently camped cell when the terminal 401 accesses to a different cell and the frequency point priority information for the network slice for the terminal 401 supported by different cells is different. The first case includes at least one of the following: the T320 timer of the terminal does not expire; the first timer does not expire, and the first frequency point priority information is valid before expiry of the first timer; the terminal 401 does not initiate the RRC connection establishment procedure; and the terminal 401 is in a non-connected state.

In summary, in the method provided in the embodiments, the frequency point priority information for the network slice is adjusted according to the second frequency priority information when the first frequency point priority information and the second frequency point priority information for the network slice are different. This method can solve the problem of inaccurate frequency point priority confirmation caused by different frequency point priority information for the same network slice supported by different cells when cell handover is performed, thereby avoiding determining the frequency point priority based on timer information only.

The above embodiments may be implemented individually, or the embodiments may be implemented in free combination.

Figure 8:
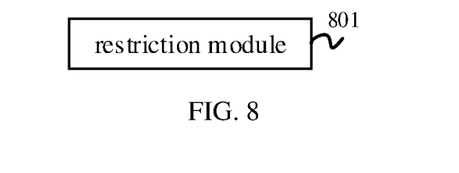
FIG. 8 is a block diagram of a slice information usage device according to an example embodiment of the present disclosure.

FIG. 8 is a block diagram of a slice information usage device according to an example embodiment of the present disclosure. The device includes an AS. As shown in FIG. 8, the device 80 includes a restriction module 801.

The restriction module 801 is configured to: in a case where the AS of the device obtains slice information of the device, restrict use of the slice information.

Optionally, restricting use of the slice information includes:
the slice information being used only for at least one of:
cell selection, cell reselection, resource selection and access to a network;
and/or,
the slice information being not allowed to be reported to a network device.

Optionally, after the device has completed a random access procedure, the slice information is not allowed to be reported to the network device via a first message, wherein the first message is a message for the device to reply to the network device that radio resource control establishment or reestablishment is completed.

Optionally, the restriction module 801 is configured to:
in a case where the AS of the device obtains the slice information of the device and a first condition is met, restrict the use of the slice information.

Optionally, the first condition includes at least one of the following that:
the device supports a communication protocol version equal to or greater than a specified communication protocol version;
the device is a device supporting at least one of cell selection, cell reselection, resource selection and access to the network based on the slice information;
the device is a device having a capability to perform at least one of cell selection, cell reselection, resource selection and access to the network based on the slice information;
the device is a device supporting a network slice; and
a restriction indication sent by the network device is received.

Optionally, the slice information includes at least one of:
a slice identity corresponding to a network slice;
slice priority information corresponding to the network slice;
frequency point information corresponding to the network slice; and
frequency point priority information corresponding to the network slice.

Optionally, the slice information is determined by the device;
or,
the slice information is indicated or configured by the network device.

Figure 9:
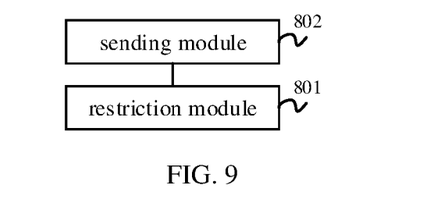
FIG. 9 is a block diagram of a slice information usage device according to an example embodiment of the present disclosure.

Optionally, the device further includes a Non-Access Stratum (NAS). As shown in FIG. 9, the device 80 further includes a sending module 802.

The sending module 802 is configured to send, by the NAS of the device, the slice information to the AS.

Figure 10:
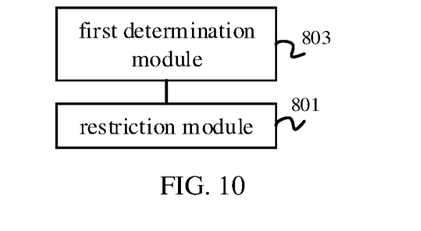
FIG. 10 is a block diagram of a slice information usage device according to an example embodiment of the present disclosure.

Optionally, as shown in FIG. 10, the device 80 further includes a first determination module 803.

The first determination module 803 is configured to: determine, by the NAS of the device, whether to send the slice information to the AS according to a mode indication from a core network device.

Optionally, the first determination module 803 is configured to:
in a case where the mode indication is a first mode indication, determine to send the slice information to the AS;
in a case where the mode indication is a second mode indication, determine not to send the slice information to the AS;
wherein the first mode indication is sent by the core network device when the device meets a second condition, and the second mode indication is sent by the core network device when the device does not meet the second condition.

Figure 11:
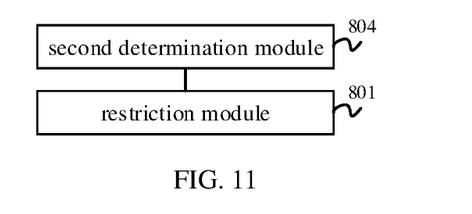
FIG. 11 is a block diagram of a slice information usage device according to an example embodiment of the present disclosure.

Optionally, as shown in FIG. 11, the device 80 further includes a second determination module 804.

The second determination module 804 is configured to: determine, by the NAS of the device, whether to send the slice information to the AS according to the second condition.

Optionally, the second determination module 804 is configured to:
determine, by the NAS of the terminal, not to send the slice information to the AS when it is determined that the device does not meet the second condition; or
determine, by the NAS of the terminal, to send the slice information to the AS when it is determined that the device meets the second condition.

Optionally, the second condition includes at least one of the following that:
the device supports a communication protocol version equal to or greater than a specified communication protocol version;
the device is a device supporting at least one of cell selection, cell reselection, resource selection and access to a network based on the slice information;
the device is a device having a capability to perform at least one of cell selection, cell reselection, resource selection, and access to the network based on the slice information; and
the device is a device supporting a network slice.

Figure 12:
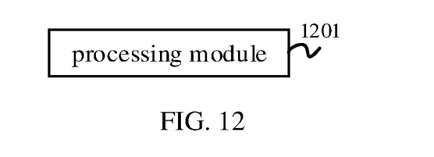
FIG. 12 is a block diagram of a slice information usage device according to an example embodiment of the present disclosure.

FIG. 12 is a block diagram of a slice information usage device according to an example embodiment of the present disclosure. As shown in FIG. 12, the device 120 includes a processing module 1201.

The processing module 1201 is configured to: when first frequency point priority information and second frequency point priority information for a network slice are different, use the second frequency point priority information, or ignore the first frequency point priority information, or update the first frequency point priority information according to the second frequency point priority information;
wherein the first frequency point priority information is frequency point priority information saved by the device for the network slice, and the second frequency point priority information is frequency point priority information indicated or configured by a network side for the network slice.

Optionally, the processing module 1201 is configured to:
in a first case, when the first frequency point priority information and the second frequency point priority information for the network slice are different, use the second frequency point priority information, or ignore the first frequency point priority information, or update the first frequency point priority information according to the second frequency point priority information, wherein the first case includes at least one of the following that:

a T320 timer does not expire;

a first timer does not expire, and the first frequency point priority information is valid before expiry of the first timer;

the device does not initiate a Radio Resource Control (RRC) connection establishment procedure; and the device is in a non-connected state.

Figure 13:
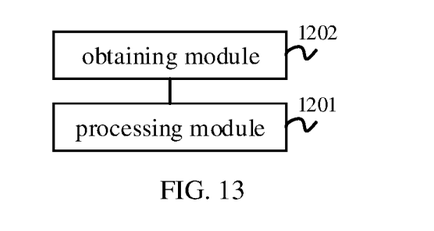
FIG. 13 is a block diagram of a slice information usage device according to an example embodiment of the present disclosure.

Optionally, as shown in FIG. 13, the device 120 further includes an obtaining module 1202.

The obtaining module 1202 is configured to:

obtain, by an AS of the device, the first frequency point priority information via system information;

or, obtain, by the AS of the device, the first frequency point priority information via a dedicated RRC message;

or, obtain, by the AS of the device, the first frequency point priority information from a NAS, wherein the first frequency point priority information is obtained by the NAS from a core network device.

Figure 14:
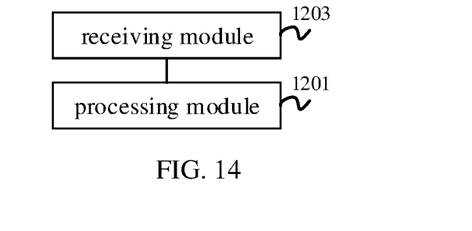
FIG. 14 is a block diagram of a slice information usage device according to an example embodiment of the present disclosure.

As shown in FIG. 14, the device 120 further includes a receiving module 1203.

The receiving module 1203 is configured for the device to receive slice information indicated or configured by a network device, wherein the slice information includes the second frequency point priority information.

Optionally, the slice information further includes at least one of:

a slice identity corresponding to the network slice;

slice priority information corresponding to the network slice;

frequency point information corresponding to the network slice; and frequency point priority information corresponding to the network slice.

Optionally, the receiving module 1203 is configured for the device to receive a dedicated RRC message sent by an access network device, wherein the dedicated RRC message carries the slice information;

or the receiving module 1203 is configured for the device to receive a broadcast message sent by the access network device, wherein the broadcast message carries the slice information;

or the receiving module 1203 is configured for the device to receive a NAS message sent by a core network device, wherein the NAS message carries the slice information.

It should be noted that the devices provided in the above embodiments, in realizing their functions, are only illustrated by the above-mentioned division of functional modules. In actual applications, the above-mentioned functions can be assigned to different functional modules according to actual needs, i.e., the content structure of the devices is divided into different functional modules to accomplish all or part of the above-described functions.

With respect to the devices in the above examples, the specific way in which each module performs its operation has been described in detail in the examples of the methods, and will not be described in detail here.

Figure 15:
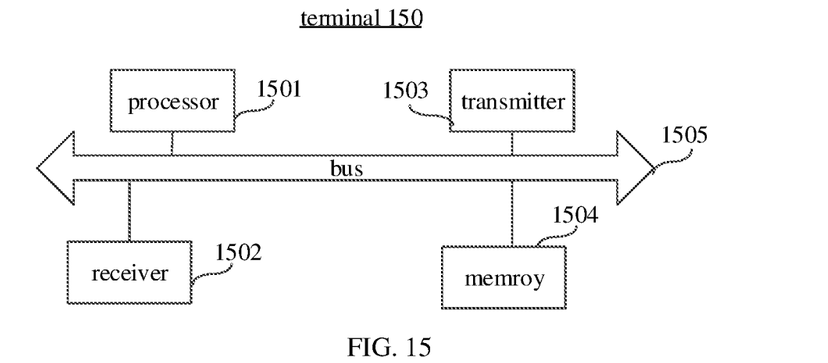
FIG. 15 is a schematic diagram showing the structure of a terminal according to an example embodiment of the present disclosure.

FIG. 15 is a schematic diagram showing the structure of a terminal according to an example embodiment of the present disclosure. The terminal 150 includes: a processor 1501, a receiver 1502, a transmitter 1503, a memory 1504, and a bus 1505.

The processor 1501 includes one or more processing cores, and the processor 1501 performs various functional applications as well as information processing by running software program(s) as well as module(s).

The receiver 1502 and the transmitter 1503 may be implemented as a communication component, which may be a communication chip.

The memory 1504 is connected to the processor 1501 via the bus 1505.

The memory 1504 may be used to store at least one instruction and the processor 1501 is used to execute the at least one instruction to implement the various steps in the method embodiments described above.

In addition, the memory 1504 may be implemented by any type of volatile or non-volatile storage device or a combination thereof. The volatile or non-volatile storage devices include, but not limited to: a magnetic disk or an optical disk, an Electrically Erasable Programmable Read Only Memory (EEPROM), an Erasable Programmable Read Only Memory (EPROM), a Static Random Access Memory (SRAM), a Read-Only Memory (ROM), a magnetic memory, a flash memory, or a Programmable Read-Only Memory (PROM).

In an example embodiment, there is also provided a computer readable storage medium. The computer readable storage medium stores at least one instruction, at least one program, code set or instruction set, the at least one instruction, the at least one program, the code set or the instruction set is loaded and executed by the processor to implement the slice information usage method performed by the terminal according to the above method embodiments.

An embodiment of the present disclosure further provides a chip. The chip includes a programmable logic circuit and/or a program instruction. When the chip is run on a terminal, the terminal is caused to implement the slice information usage method executed by a terminal as described above.

An embodiment of the present disclosure further provides a computer program product. When the computer program product is run on a terminal device, the terminal device is caused to perform the slice information usage method as described above.

One of skill in the art should be aware that in one or more of the above examples, the functions described in embodiments of the present disclosure may be implemented with hardware, software, firmware, or any combination thereof. When implemented using software, these functions may be stored in a computer-readable medium or transmitted as one or more instructions or codes on a computer-readable medium. The computer-readable medium includes a computer storage medium and a communication medium. The communication medium includes any medium that facilitates the transmission of computer programs from one place to another. The storage medium may be any available medium accessible to a general purpose or specialized computer.

The foregoing are only example embodiments of the present disclosure and are not intended to limit the present disclosure, and any modifications, equivalent replacements, improvements, etc., made within the spirit and principles of the present disclosure should fall within the scope of protection of the present disclosure.

What is claimed is:

1. A slice information usage method, wherein the method is applied in a terminal, and the method comprises:
when first frequency point priority information and second frequency point priority information for a network slice are different, using the second frequency point priority information, or ignoring the first frequency point priority information, or updating the first frequency point priority information according to the second frequency point priority information;
wherein the first frequency point priority information and the second frequency point priority information correspond to a same network slice, the first frequency point priority information is obtained by an Access Stratum (AS) of the terminal from system information and the first frequency point priority information is frequency point priority information saved by the terminal for the network slice, and the second frequency point priority information is frequency point priority information indicated or configured by a network side for the network slice, and the second frequency point priority information is comprised in slice information carried in a dedicated Radio Resource Control (RRC) message sent by a network device.

2. The method according to claim 1, further comprising:
in a first case, when the first frequency point priority information and the second frequency point priority information for the network slice are different, using the second frequency point priority information, or ignoring the first frequency point priority information, or updating the first frequency point priority information according to the second frequency point priority information, wherein the first case comprises at least one of the following that:
a T320 timer does not expire;
a first timer does not expire, and the first frequency point priority information is valid before expiry of the first timer;
the terminal does not initiate a Radio Resource Control (RRC) connection establishment procedure; or
the terminal is in a non-connected state.

3. The method according to claim 1, further comprising:
receiving, by the terminal, the slice information indicated or configured by the network device through the dedicated RRC message, wherein the slice information comprises the second frequency point priority information.

4. The method according to claim 3, wherein the slice information further comprises at least one of:
a slice identity corresponding to the network slice;
frequency point information corresponding to the network slice; or
frequency point priority information corresponding to the network slice.

5. The method according to claim 3, wherein receiving, by the terminal, the slice information indicated or configured by the network device comprises:
receiving, by the terminal, the dedicated RRC message sent by an access network device, wherein the dedicated RRC message carries the slice information.

6. A terminal, comprising:
a processor; and
a memory storing instructions executable by the processor;
wherein when the instructions are executed by the processor, the terminal is caused to:
when the first frequency point priority information and the second frequency point priority information correspond to a same network slice, the first frequency point priority information is obtained by an Access Stratum (AS) of the terminal from system information and first frequency point priority information and second frequency point priority information for a network slice are different, use the second frequency point priority information, or ignore the first frequency point priority information, or update the first frequency point priority information according to the second frequency point priority information;
wherein the first frequency point priority information is frequency point priority information saved by the terminal for the network slice, and the second frequency point priority information is frequency point priority information indicated or configured by a network side for the network slice, and the second frequency point priority information is comprised in slice information carried in a dedicated Radio Resource Control (RRC) message sent by a network device.

7. The terminal according to claim 6, wherein when the instructions are executed by the processor, the terminal is further caused to:
in a first case, when the first frequency point priority information and the second frequency point priority information for the network slice are different, use the second frequency point priority information, or ignore the first frequency point priority information, or update the first frequency point priority information according to the second frequency point priority information, wherein the first case comprises at least one of the following that:
a T320 timer does not expire;
a first timer does not expire, and the first frequency point priority information is valid before expiry of the first timer;
the terminal does not initiate a Radio Resource Control (RRC) connection establishment procedure; or
the terminal is in a non-connected state.

8. The terminal according to claim 6, wherein when the instructions are executed by the processor, the terminal is further caused to:
receive the slice information indicated or configured by the network device through the dedicated RRC message, wherein the slice information comprises the second frequency point priority information.

9. The terminal according to claim 8, wherein the slice information further comprises at least one of:
a slice identity corresponding to the network slice;
frequency point information corresponding to the network slice; or
frequency point priority information corresponding to the network slice.

10. The terminal according to claim 8, wherein when the instructions are executed by the processor, the terminal is further caused to:
receive the dedicated RRC message sent by an access network device, wherein the dedicated RRC message carries the slice information.

11. A network device, comprising:
a processor; and
a memory storing instructions executable by the processor;
wherein when the instructions are executed by the processor, the network device is caused to:

indicate or configure slice information of a terminal through a dedicated Radio Resource Control (RRC) message sent by a network device, wherein the slice information comprises second frequency point priority information for a network slice;

wherein when first frequency point priority information and the second frequency point priority information for the network slice are different, the second frequency point priority information is used by the terminal, or the first frequency point priority information is ignored, or the first frequency point priority information is updated according to the second frequency point priority information;

wherein the first frequency point priority information and the second frequency point priority information correspond to a same network slice, the first frequency point priority information is obtained by an Access Stratum (AS) of the terminal from system information and the first frequency point priority information is frequency point priority information saved by the terminal for the network slice.

12. The network device according to claim 11, wherein when the instructions are executed by the processor, the network device is caused to: send the dedicated RRC message by an access network device, wherein the dedicated RRC message carries the slice information.

13. The network device according to claim 11, wherein in a first case, when the first frequency point priority information and the second frequency point priority information for the network slice are different, the second frequency point priority information is used by the terminal, or the first frequency point priority information is ignored, or the first frequency point priority information is updated according to the second frequency point priority information, wherein the first case comprises at least one of the following that:

a T320 timer does not expire;

a first timer does not expire, and the first frequency point priority information is valid before expiry of the first timer;

the terminal does not initiate a Radio Resource Control (RRC) connection establishment procedure; or the terminal is in a non-connected state.

14. The network device according to claim 11, wherein the slice information further comprises at least one of:

a slice identity corresponding to the network slice;

frequency point information corresponding to the network slice; or frequency point priority information corresponding to the network slice.

15. The network device according to claim 11, wherein the slice information is used only for at least one of: cell selection, cell reselection, resource selection or access to a network;

or, wherein the slice information is not allowed to be reported to the network device.

* * * * *